United States Patent [19]
Hinchliff

[11] 3,799,562
[45] Mar. 26, 1974

[54] SPRING HANGER BRACKET FOR VEHICLES

[75] Inventor: Richard W. Hinchliff, Portland, Oreg.

[73] Assignee: Merritt Equipment Co., Portland, Oreg.

[22] Filed: June 21, 1972

[21] Appl. No.: 264,772

[52] U.S. Cl. ..... 280/104.5 B, 280/124 R, 267/54 R
[51] Int. Cl. .............................................. B60g 5/04
[58] Field of Search .. 280/104.5 R, 104.5 B, 124 R, 280/111, 112 R; 267/54 R, 54 A, 56

[56] References Cited
UNITED STATES PATENTS

| | | | |
|---|---|---|---|
| 3,233,915 | 2/1966 | Hamlet | 280/104.5 R |
| 3,586,308 | 6/1971 | King | 280/104.5 B |
| 3,580,347 | 5/1971 | McGee | 280/104.5 B |
| 2,024,528 | 12/1935 | Konetsky | 280/104.5 B |
| 3,222,082 | 12/1965 | Raidel | 280/104.5 B |
| 3,227,468 | 1/1966 | Raidel | 280/104.5 B |

*Primary Examiner*—Philip Goodman
*Assistant Examiner*—John A. Carroll
*Attorney, Agent, or Firm*—Eugene M. Eckelman

[57] ABSTRACT

A spring hanger bracket for vehicles having an upper curved spring seat and a lower cushioning member. This cushioning member is spaced below the curved spring seat a selected amount such as to allow proper working of a spring end on the seat but at the same time to prevent unnecessary clatter or slapping of the spring on the seat when the vehicle bounces up and down on a road surface.

1 Claim, 3 Drawing Figures

PATENTED MAR 26 1974 3,799,562

3,799,562

1

SPRING HANGER BRACKET FOR VEHICLES

BACKGROUND OF THE INVENTION

This invention relates to new and useful improvements in spring hanger brackets for vehicles and their combination with spring suspension assemblies.

Spring suspension assemblies for vehicles, such as for hauling type vehicles, have heretofore utilized hanger brackets in association with leaf springs wherein the springs in the suspension assemblies slidably bear against spring seats in the hangers. In order to confine the ends of the springs operably in the hanger brackets, namely, between the spring seats and the bottom of the hanger brackets, such brackets are provided with cross pins of metal construction.

The spring hanger brackets have heretofore been considered adequate in their use upon heavy vehicles since such heavy vehicles are substantially stable on the road even when empty. However, the art has developed to a point that the vehicles are constructed of extremely lightweight components, such as aluminum, to carry a greater pay load, and their stability on the road is therefore lessened, particularly the up and down bouncing when travelling unloaded. Such bouncing of the vehicle causes the spring ends to clatter in their hanger brackets, thus causing an undesirable noise and also subjecting the springs and the hanger brackets to mechanical damage.

SUMMARY OF THE INVENTION

According to the present invention and forming a primary objective thereof, a spring suspension assembly is provided for vehicles which utilizes a novel spring hanger bracket of a construction which reduces the clatter of spring ends in the brackets and which also reduces the possibility of damage to such hanger brackets or the springs.

A more particular object of the present invention is to provide a spring hanger bracket of the type described which utilizes an upper curved spring seat and a lower cushioning member in the form of a resilient spool which, while permitting the spring ends to work effectively in the hanger brackets, at the same time reduces the clatter and protects the bracket and spring ends from damage.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 2:
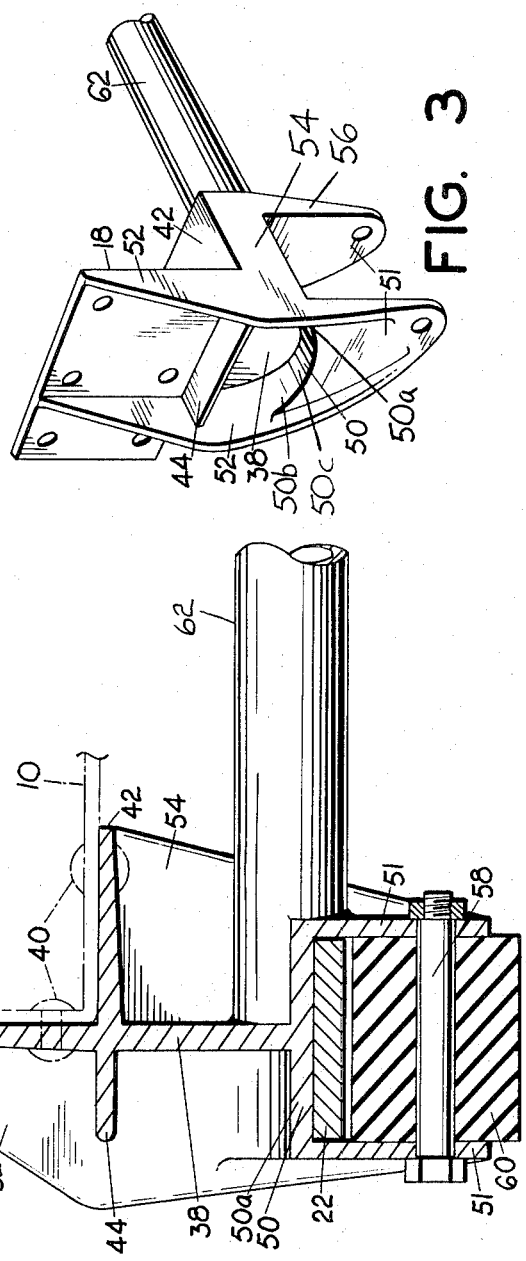
FIG. 2 is an enlarged vertical sectional view taken on the line 2—2 of FIG. 1.
Figure 1:
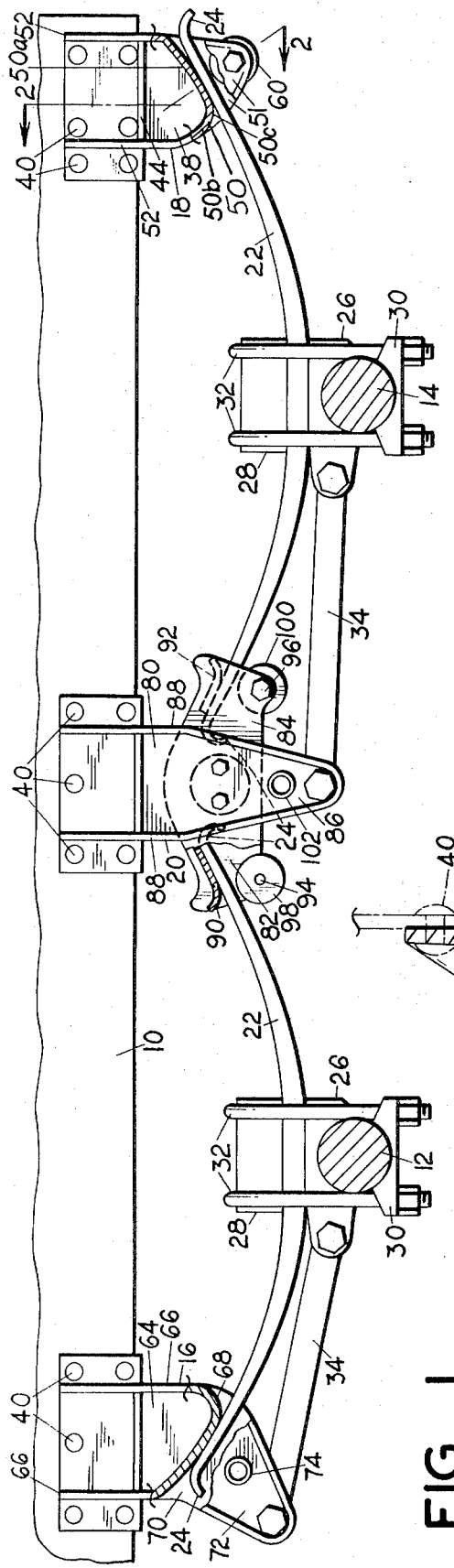
FIG. 1 is a side elevational view, partly broken away, of a spring suspension assembly for vehicles embodying principles of the present invention.

With particular reference to the drawings, and first to FIG. 1, the reference numeral 10 designates a chassis or frame portion of a vehicle to which the suspension assemblies are to be secured. As seen in FIG. 2, this frame portion has a side surface and a bottom surface extending at right angles to each other. FIG. 1 illustrates a suspension assembly for tandem axles 12 and 14 wherein there is employed a front spring hanger bracket 16, a rear spring hanger bracket 18, and a center or equalizer spring hanger bracket 20. It is to be understood that although a dual axle assembly is shown, a greater number of axles may be employed by a suitable arrangement of front and rear hanger brackets 16 and 18, respectively, and center or equalizer hanger brackets 20. It is also to be understood that the present invention can be applied to a single axle assembly wherein the spring hanger brackets would comprise simply the front hanger bracket 16 and the rear hanger bracket 18.

The present system is illustrated in connection with single leaf type spring structures 22 having downwardly curved end portions 24. This type of leaf spring is of conventional construction and is associated with axle attaching structure comprising a lower spring seat 26 and upper and lower U-bolt plates 28 and 30, respectively, secured in the assembly by U-bolts 32. Forwardly extending torque arm assemblies 34 may be employed between the spring assemblies and their respective spring hanger brackets, such torque arm assemblies and their operation being of conventional structure.

Figure 3:
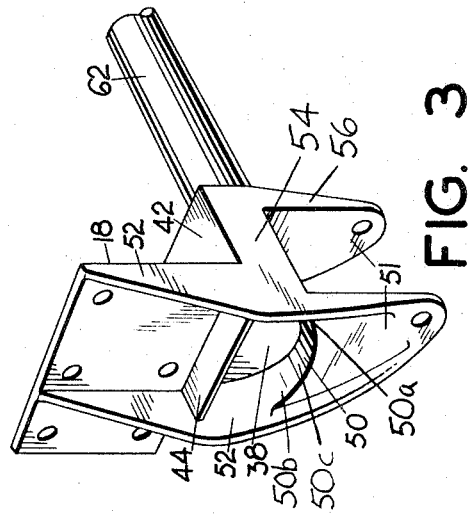
FIG. 3 is a perspective view of a bracket of the invention, a portion of the bracket being removed for clarity.

The concept of the invention resides in the construction of the spring hanger brackets and particularly the two rearwardmost hanger brackets 18 and 20, as well as the combination of one or more of these brackets with spring suspension assemblies. The rear bracket 18 will first be detailed. It comprises a vertical plate-like body portion 38, FIGS. 2 and 3, the upper part of which is adapted to lie flush against a side of the frame member 10 for securement thereto as by rivets 40. Body portion 38 has a flange 42 which extends toward the opposite side of the vehicle and which abuts against the underside of the frame member 10 for further securement of the bracket to the vehicle. An outwardly extending reinforcing rib 44 projects from the body portion in substantially the plane of the flange 42 for reinforcing the bracket.

The lower end of body portion 38 is integral with a longitudinally extending spring seat 50, this seat extending at right angles to the body portion as viewed in cross section, FIG. 2. As best seen in FIG. 1, spring seat 50 has a portion 50a which extends forwardly in a downwardly angled direction from the rear of the bracket and an upwardly curved portion 50b adjacent to the front, a portion 50c between the angled portions 50a and 50b being rounded on its bottom surface and forming the upper cam surface or seat for the spring. Side wall segments 51, narrowing toward the bottom, lead downwardly from the seat 50, and the bracket has laterally projecting ribs 52 on its outer side which are disposed adjacent to the front and rear edges and which extend from the upper end to a point just short of the bottom tapered end. Laterally projecting reinforcing walls 54 are also provided on the inner side of the bracket adjacent to the front and rear edges, these walls having rib extensions 56 extending downwardly from the flange 42 to a point just short of the bottom tapered end.

Detachably secured between flanges 51 is a cross pin 58 which may comprise a shoulder bolt. Mounted on the pin 58 is a cushioning member or resilient spool 60. The diameter of this spool is such that there is a small clearance between it and the spring. This allows longitudinal working of the spring on the seat 50 but at the same time provides only a minimum clearance below the spring so that the latter cannot clatter against the seat, as will be described in greater detail hereinafter.

A cross rod 62 is secured to the inner side of bracket 18, as by welding, and has similar connection to the same type of bracket in the spring suspension assembly on the other side of the vehicle.

The front hanger bracket 16 employs a vertical body portion 64, upright ribs 66 and a longitudinally extending spring seat 68. This bracket has side wall segments 70 and 72 from the seat to the bottom between which is secured a cross rod 74. Rod 74 may project beyond the inner side of the bracket 16 and be connected to a similar hanger bracket in a spring suspension assembly on the opposite side. It is not necessary that the front hanger bracket have a cushioning member, as will be more apparent hereinafter.

The center or equalizer bracket 20 has a vertical body portion 80 similar to the other brackets. This bracket, however, has a pair of side walls 82 and 84 projecting forwardly and rearwardly from the body portion in parallel relation, each of such side walls having an integral center downward extension 86. Upright reinforcing ribs 88 are provided on both sides of the bracket. Secured between the side walls 82 and 84 on opposite sides of center are longitudinally extending forward and rearward upper spring seats 90 and 92, respectively. The walls 82 and 84 support front and rear cross pins 94 and 96, respectively, and these pins support cushioning members or resilient spools 98 and 100, respectively, which are of selected diameter to allow free longitudinal working of the springs on the seats 90 and 92 but at the same time provide a minimum clearance below the springs to eliminate any appreciable clatter of the springs against their seats, as in the other brackets. A cross rod 102 extends integrally from bracket 20 to a similar bracket on the other side of the chassis.

The present spring hanger brackets as described provide a greatly improved operation of the suspension assemblies and consequently improved operation of the vehicle on the road. That is, as explained hereinbefore, when the vehicle is constructed primarily of substantially light material, such as aluminum, it will bounce considerably on the highway, causing the spring ends to chatter in the brackets. The present structure overcomes this noisy and damaging action by confining the spring ends at their bottom sides by resilient limit or stop means in the form of the bushings 60 and 98, 100. As stated, the clearance provided between the bushings and the underside of the springs is predetermined such that while the springs can adjust longitudinally on their respective seats in the up and down movement of the vehicle relative to the axles, the spring ends are sufficiently confined to prevent chatter on the seats. The vehicle thus runs quieter and the springs and hanger brackets therefor are less subject to damage.

The greatest spring action occurs at the rear of the vehicle in an unloaded condition. It is thus desirable that in a tandem axle assembly as shown, the two rearwardmost brackets 18 and 20 utilize the cushioning members under the springs. In such axle assembly, it has been found unnecessary to provide the front bracket 16 with a cushioning member. Where a single axle suspension is used, however, the forward spring hanger bracket may or may not employ a cushioning member, but in all cases the rear bracket is to be equipped with such a cushioning member.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A vehicle spring suspension assembly comprising a. an axle,
b. a leaf spring secured to said axle with the ends thereof extending in opposite forward and rearward directions,
c. a forward spring hanger bracket having a vertical body portion arranged at its upper end to be secured to the frame of a vehicle and having means engageable with a forward end of said spring,
d. a rear spring hanger bracket having a vertical upper body portion arranged to be secured to a vertical portion of a vehicle frame,
e. a right angle transverse flange on said body portion extending from a point below the upper end of the latter secured to the underside of the vehicle frame,
f. a longitudinally extending seat portion integral with said body portion and extending across the bottom of the latter in right angle relation below said flange,
g. said seat portion having a downwardly facing surface engageable by a rearward portion of said leaf spring,
h. said spring seat being rounded longitudinally,
i. vertical ribs integral with said body portion and said seat for reinforcing said body portion and the seat, j. a pair of flanges depending from respective outer transverse portions of said seat,
k. a cross pin secured transversely between said flanges at the lower portion thereof,
l. and a transversely extending resilient cushioning member supported on said cross pin,
m. said cushioning member being of selected thickness whereby to terminate upwardly just short of said spring member to provide a clearance between it and said leaf spring permitting forward and rearward working of said spring but preventing appreciable up and down slapping of the spring against the seat should the vehicle bounce on a road surface.

* * * * *